United States Patent [19]
Barbier et al.

[11] Patent Number: 5,574,388
[45] Date of Patent: Nov. 12, 1996

[54] EMULATION SYSTEM HAVING A SCALABLE MULTI-LEVEL MULTI-STAGE PROGRAMMABLE INTERCONNECT NETWORK

[75] Inventors: Jean Barbier, Chatillon; Olivier LePape, Paris; Frederic Reblewski, Les Molieres, all of France

[73] Assignee: Mentor Graphics Corporation, Wilsonville, Oreg.

[21] Appl. No.: 542,519

[22] Filed: Oct. 13, 1995

[51] Int. Cl.[6] .............................................. H03K 19/177
[52] U.S. Cl. .......................... 326/41; 326/44; 364/488; 364/578
[58] Field of Search .................... 326/39–41, 44; 364/488–489, 578–580

[56] References Cited

U.S. PATENT DOCUMENTS

| | | | |
|---|---|---|---|
| 4,286,904 | 11/1988 | Graham, III et al. | 320/41 |
| 4,870,302 | 9/1989 | Freeman | 326/41 |
| 5,329,470 | 7/1994 | Sample et al. | |
| 5,448,496 | 9/1995 | Butts et al. | |
| 5,452,231 | 9/1995 | Butts et al. | |

OTHER PUBLICATIONS

Clos, "A Study of Non–Blocking Switching Networks," The Bell System Technical Journal, Mar. 1953, pp. 406–424.

*Primary Examiner*—David R. Hudspeth
*Attorney, Agent, or Firm*—Blakely, Sokoloff, Taylor & Zafman, L.L.P.

[57] ABSTRACT

A scalable multi-level multi-stage network topology is employed to interconnect reconfigurable logic elements within the FPGA, inter-FPGA, interlogic boards, and inter-backplanes. More specifically, under the presently preferred embodiemnt, an on-chip 3-stage inter-logic element crossbar network is provided to each FPGA for interconnecting the reconfigurable logic elements and the I/O pins of the FPGA. A two level two-stage inter-FPGA crossbard network is provided to interconnect the FPGAs and I/O pins of the logic board. A two-level two-stage inter-board crossbar network is provided to interconnect the logic boards or I/O boards for interconnecting the logic elements to external devices. Finally, a single-stage inter-backplane network and a number of PCBs are provided to interconnect multi-backplanes to form a multi-crate system.

26 Claims, 15 Drawing Sheets

5,574,388

EMULATION SYSTEM HAVING A SCALABLE MULTI-LEVEL MULTI-STAGE PROGRAMMABLE INTERCONNECT NETWORK

BACKGROUND OF THE INVENTION

1. Field of the Invention

The present invention pertains to the field of emulator design. More particularly, this invention relates to the art of interconnecting the logic elements of an emulator system.

2. Background

With advances in integrated circuit technology, various tools have been developed to aid circuit designers in designing and debugging highly complex integrated circuits. In particular, emulation systems comprising reconfigurable logic elements have been developed for circuit designers to quickly "realize" their designs and emulate operation of the circuits.

Early emulation systems include relatively small number of logic elements, in today's standard. Typically the logic elements are disposed in general purpose field programmable gate arrays (FPGAs). The FPGAs in turn are arranged into a 2-D or 3-D array, and interconnected together directly in a "nearest neighbor" manner or indirectly using full or partial crossbars made of programmable interconnect chips. As it is well known in the art, the programmable interconnect paths between the logic elements must be sufficiently "rich" or "flexible", otherwise, the time required to compile or map circuit elements of a circuit design onto the logic elements may become unacceptably long or even down right impossible.

Today, the most highly complex integrated circuits, such as a microprocessor, pack hundreds of thousands of transistors into a very small area. To emulate even a portion of these highly complex integrated circuits would require a very large emulation system having a significantly larger number of reconfigurable logic elements that is of an order of magnitude greater than the emulation system known in the art in just a few years ago.

While there have been significant advances in integration as well as surface mounting technology at the same time, allowing more logic elements to be packed into the general purpose FPGAs and in turn mounted on circuit boards of substantially the same size, it is still impossible to build one of these large emulation systems with a handful of circuit boards. A large number of circuit boards must be employed. It is no longer uncommon to take days/weeks to compile or map one of these highly complex circuit designs onto a large number of logic elements packaged in a large number of general purpose FPGAs and circuit boards interconnected in a conventional manner, even with today's high performance workstations. Thus, a new and innovative way of packaging and interconnecting these large number of logic elements is clearly desirable.

On the other hand, clearly not all circuit designers require these large emulation systems. Indeed, the market requirement spans a wide spectrum, from the low end entry level systems having a handful of circuit boards, to the intermediate systems having a moderate number of circuit boards, and the high end systems described earlier. Thus, from a manufacturer's perspective, it is further desirable that the new and innovative way of packaging and interconnecting the reconfigurable logic elements be scalable, and works well for the low end systems as well as the high end systems.

Furthermore, it is fully anticipated that integration and surface mounting technology will continue to advance, allowing even more dense integration and packaging. Thus, it is further desirable if the new and innovative way of packaging and interconnecting the reconfigurable logic elements is easily extensible to take advantage advances in these technologies.

As will be disclosed in more detail below, the present invention achieves these and other desirable results which will be apparent to those skilled in the art from the description to follow.

SUMMARY OF THE INVENTION

A scalable multi-level multi-stage interconnect network topology is employed to interconnect reconfigurable logic elements of an emulation system.

In addition to the reconfigurable logic elements, advantageously, each FPGA is provided with an on-chip multi-stage network of interconnect crossbars for interconnecting the reconfigurable logic elements and the input/output (I/O) pins of the FPGAs.

The FPGAs are in turn distributively disposed on a number of logic boards. Each logic board is provided with a multi-stage network of interconnect crossbars for interconnecting the FPGAs of the logic board and the I/O connections of the logic board. However, advantageously, the first stage of the inter-FPGA network is distributively integrated into the FPGAs of the logic board.

A number of the logic boards are in turn coupled to a backplane assembly to form a crate. Each backplane assembly is provided with a multi-stage network of interconnect crossbars for interconnecting the logic boards or I/O boards coupled to the backplane assembly. Collectively, the last stages of the inter-FPGA networks of the logic boards "double up" as the first stage of the inter-logic board network.

Finally, one or more crates are connected together to form a system. For a multi-crate embodiment, another single-stage network of interconnect crossbars is provided for interconnecting the backplane assemblies of the various crates. The single stage is distributively disposed in the backplane assemblies of the various crates. In one embodiment, the various crossbars are correspondingly coupled together using a number of printed circuit boards.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention. It should be noted that the present invention can be practiced in a variety of manners, such as by fabrication by silicon or gallium arsenide or other processes.

In many of the descriptions which follow reference is made to various specific numeric examples. For example, specific numbers of logic elements, boards, signals, and connections are referenced. It is to be appreciated that these specific numbers are examples only, and that the present invention is not limited to embodiments using only those specific numbers.

Figure 1:
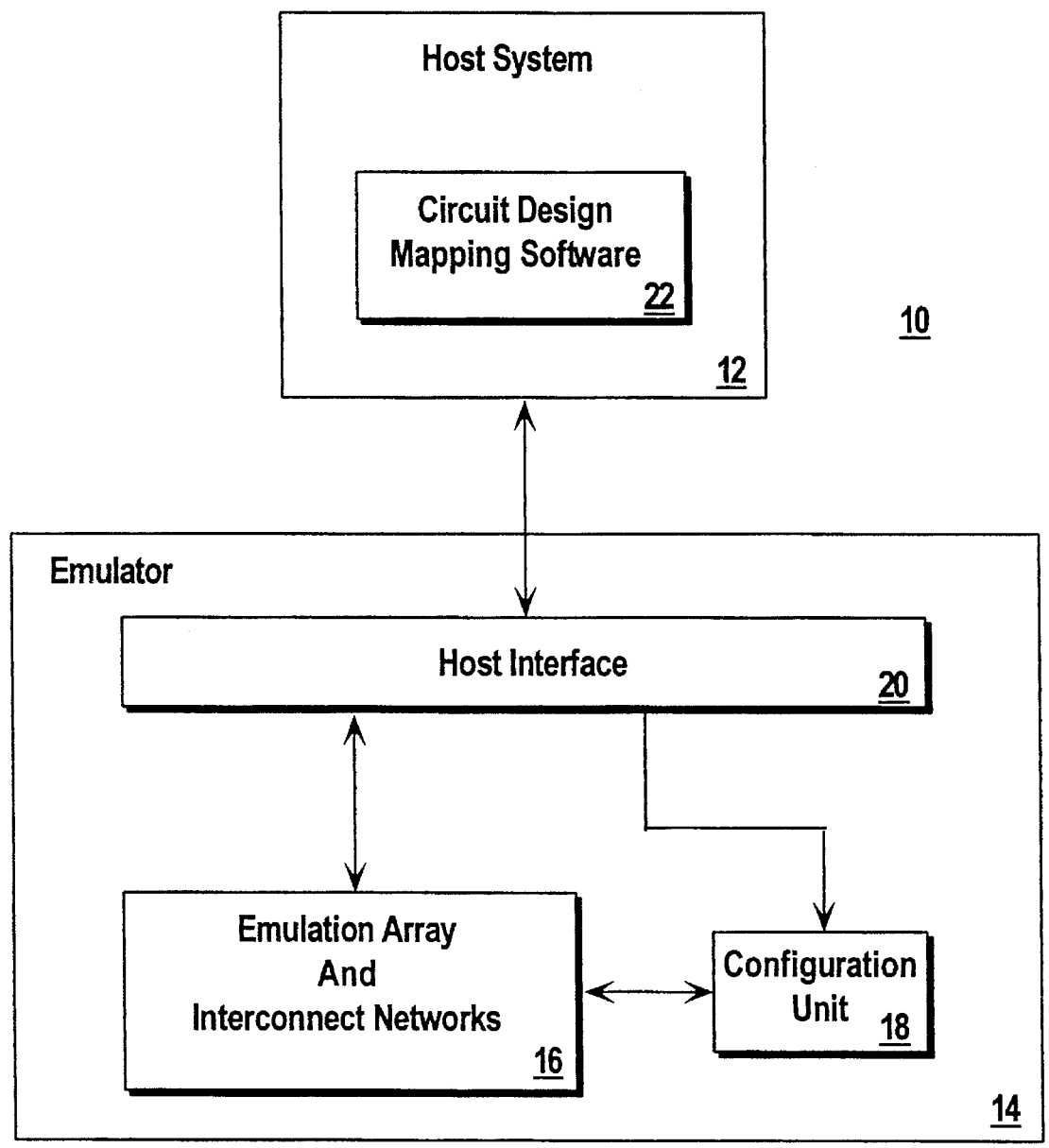
FIG. 1 is a block diagram showing an emulation system which incorporates the teachings of the present invention.

FIG. 1 is a block diagram showing an emulation system which incorporates the teachings of the present invention. As illustrated, an emulation system 10 includes host system 12 and emulator 14. Host system 12 includes in particular circuit design mapping software 22. In one embodiment, circuit design mapping software 22 is implemented in software. In this embodiment, circuit design mapping software 22 is stored in a suitable storage medium (not shown) of host system 12, and is loaded into memory (not shown) of host system 12 for execution by a processor (not shown) of host system 12. Host system 12 is intended to represent a broad category of host systems found in conventional emulation systems known in the art, and thus will not be discussed further.

Emulator 14 includes emulation array and interconnect networks 16, a configuration unit 18 and host interface 20 coupled to each other as shown. Configuration unit 18 and host interface 20 perform their conventional functions, and are well known in the art. They will not be further described.

As will be described in more detail below, emulation array and interconnect networks 16 comprises a number of reconfigurable logic elements (LEs) distributively packaged in a number of FPGAs, which in turn are distributively packaged in a number of logic boards. A number of logic boards are combined together to form a crate. For multi-crate embodiments, a number of crates are combined together. A scalable multi-level multi-stage network topology is employed to interconnect the LEs together within the FPGAs, and then the FPGAs, the logic boards, and the crates.

Figure 2:
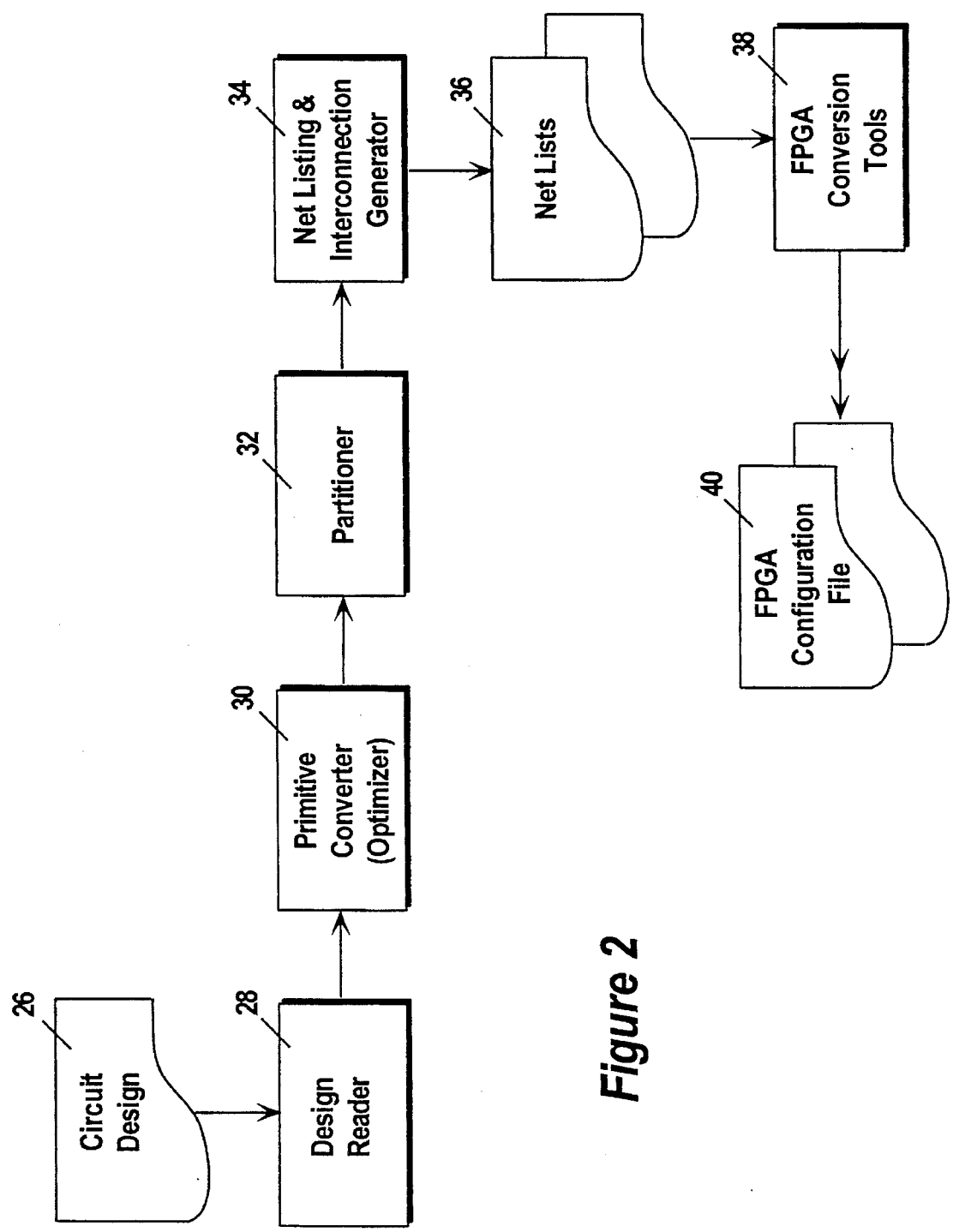
FIG. 2 is a block diagram showing a general flow of programming an emulation system such as may be used with one embodiment of the present invention.

FIG. 2 is a block diagram showing a general flow of programming an emulation system such as may be used with one embodiment of the present invention. As shown, a circuit design 26 is processed by conventional elements of mapping software 22, such as design reader 28, primitive converter 30, partitioner 32, and netlisting and interconnection generator 34 to generate netlists 36, which in turn is processed by field programmable gate array (FPGA) conversion tools 38 of mapping software 22 to generate FPGA configuration files 40. In one embodiment, primitive converter 30 includes an optimizer (not shown) for optimizing the circuit design 26. FPGA configuration files 40 are then used to configure emulator 14 to "realize" circuit design 26 on emulator 14.

Having now described an overview of emulation system 10, we now proceed to describe the FPGAs employed therein, in particular, the manner in which the LEs of each FPGA are interconnected to each other and to the I/O connections or pins of the FPGAs.

Figure 3:
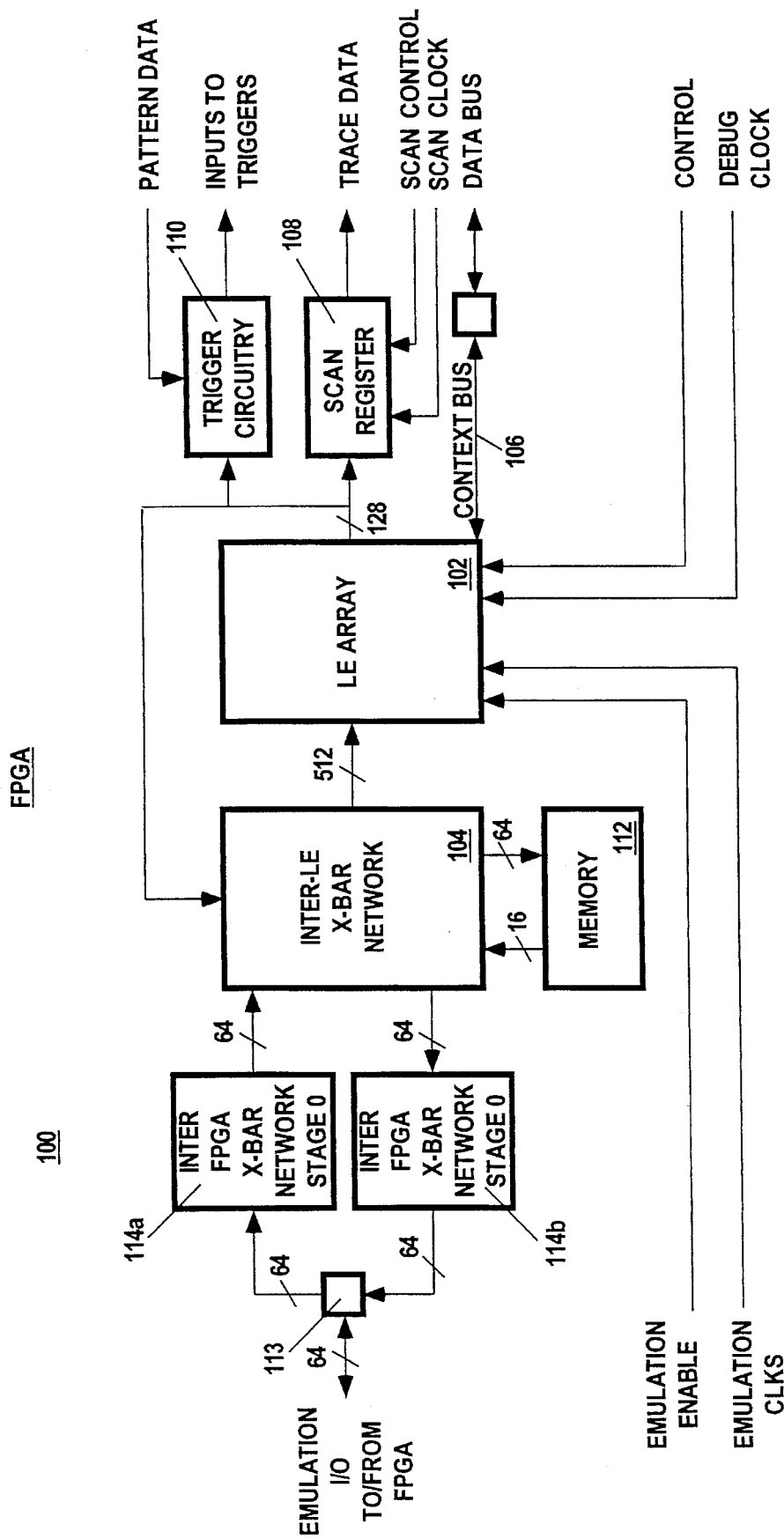
FIG. 3 is a block diagram showing a field programmable gate array which may be used with one embodiment of the present invention

FIG. 3 is a block diagram showing a FPGA which may be used with one embodiment of the present invention. FPGA 100 includes LE array 102, and I/O pins 113. LE array 102 includes multiple reconfigurable LEs. As it is well known in the art, the reconfigurable LEs are used to "realize" various elements of circuit designs, whereas I/O pins 113 are used to provide inputs/outputs to/from FPGA 100. Each of I/O pins 113 can be statically configured to be either an input or an output pin. This static configuration can be accomplished in any of a wide variety of conventional manners, such as by way of a configuration register.

Preferably, FPGA 100 also includes memory 112, context bus 106, scan register 108, and trigger circuitry 110. Memory 112 facilitates usage of FPGA 100 to emulate circuit design with memory elements. Context bus 106, scan register 108 and trigger circuitry 110 provide on-chip integrated debugging facility for FPGA 100. These elements are described in U.S. patent application Ser. No. 08/542,838, entitled "A Field Programmable Gate Array with Integrated Debugging Facilities", assigned to the corporate assignee of the present invention and filed concurrently with the present application, which is hereby fully incorporated by reference.

More importantly, in accordance to the teachings of the present invention, in lieu of packing as many LEs as possible onto FPGA 100, inter-LE crossbar network 104 is advantageously integrated into FPGA 100. Inter-LE crossbar network 104 interconnects the LEs of LE array 102, memory 112, and I/O pins 113 of FPGA 100, to be described more fully below. Experience has shown that distributing the LEs into more FPGAs and providing rich on-chip interconnect as well as integrated debugging facilities for the LEs actually achieves an overall improved system performance over the conventional approach of concentrating as many LEs on-chip as possible and then providing the rich interconnect off-chip and debugging facilities off-board.

Additionally, under the presently preferred embodiment, a corresponding portion of inter-FPGA crossbar network stage 0 114a/114b is also advantageously integrated into FPGA 100, exploiting the "excess" real estate of FPGA 100[1], resulting in a reduction of logic board size and overall manufacturing cost. The various portions of inter-FPGA crossbar network stage 0 114a/114b together with the remainder of inter-FPGA crossbar network interconnect FPGAs 100 of a logic board and the I/O connections of the logic board, which will also be described in more detail below.

[1]Typically, the numbers of LEs to be integrated in each FPGA is scaled in the power of 2, i.e. 64, 128, and 256 etc. Thus, for a given die size, there are often "excess" real estate, after laying out all the essential elements.

In one embodiment, LE array 102 includes 128 reconfigurable LEs, while memory 112 uses 8-bit input and 8-bit output, and FPGA 100 has 64 I/O pins 113.

Figure 4A:
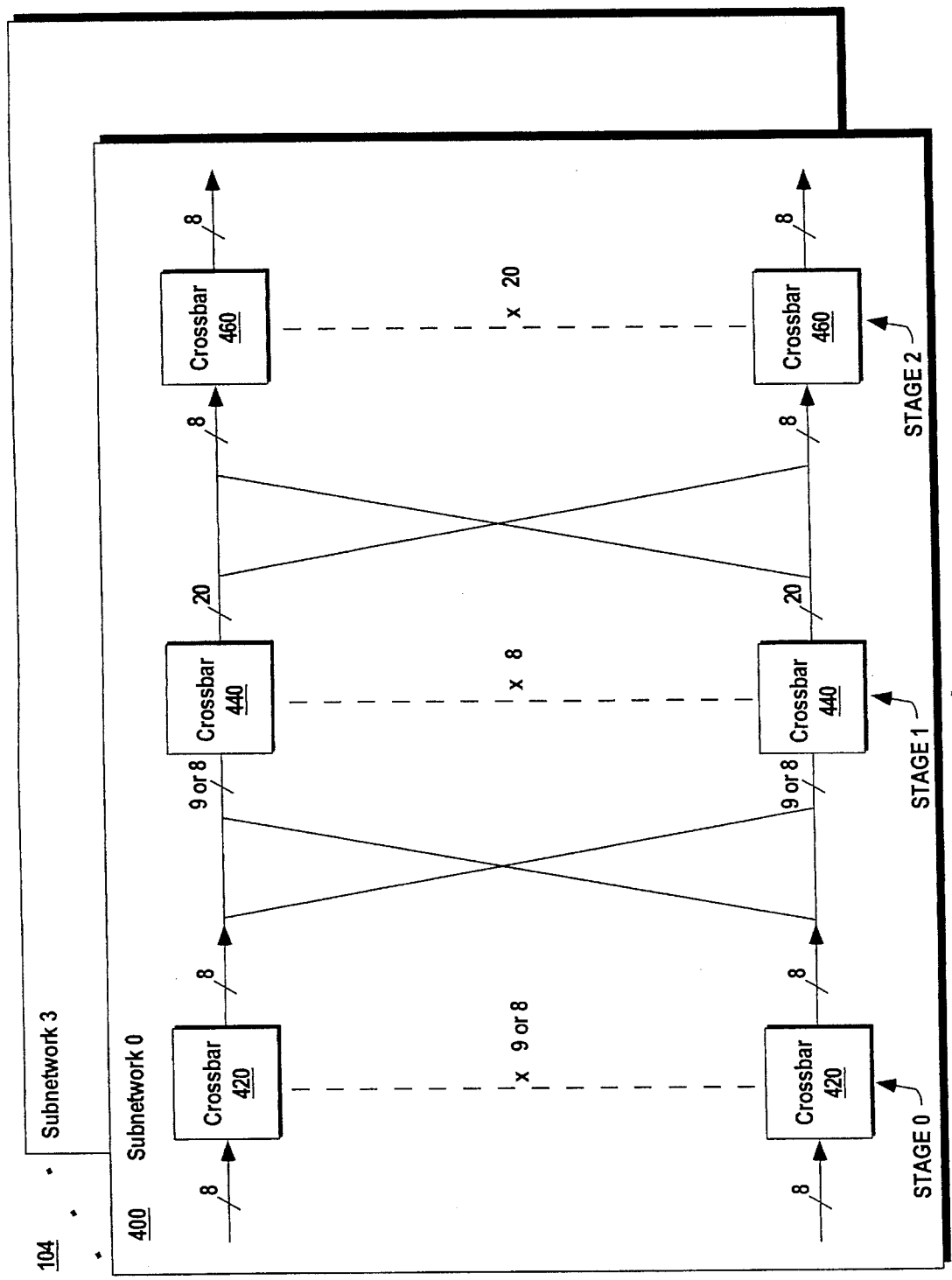
FIG. 4a is a block diagram showing an inter-LE crossbar network according to one embodiment of the present invention.

FIG. 4a is a block diagram showing an inter-LE crossbar network according to one embodiment of the present invention. For the illustrated embodiment, inter-LE crossbar network 104 includes four subnetworks of crossbars 400. A crossbar device is an interconnect device which receives multiple inputs and maps the inputs to multiple outputs of the device. Each input can be mapped to any of the multiple outputs. Which inputs are mapped to which outputs are identified by programming the crossbar device. Such crossbar devices are well known to those skilled in the art and thus will not be described further.

For the illustrated embodiment, the first two subnetworks 400 are used to map 72 inputs to 160 outputs, whereas the second two subnetwork 400 are used to map 64 inputs to 160 outputs. Each subnetwork 400 comprises three stages, stage 0, stage 1, and stage 2. Stage 0 of the first two subnetworks 400 include nine 8×8 crossbars 420, whereas stage 0 of the last two of subnetworks 400 include eight 8×8 crossbars 420. In turn, stage 1 of the first two subnetworks 400 include eight 9×20 crossbars 440, whereas stage 1 of the last two subnetworks 400 include eight 8×20 crossbars 440. Stage 2 of all four subnetworks 400 include twenty 8×8 crossbars 460.

Figure 4B:
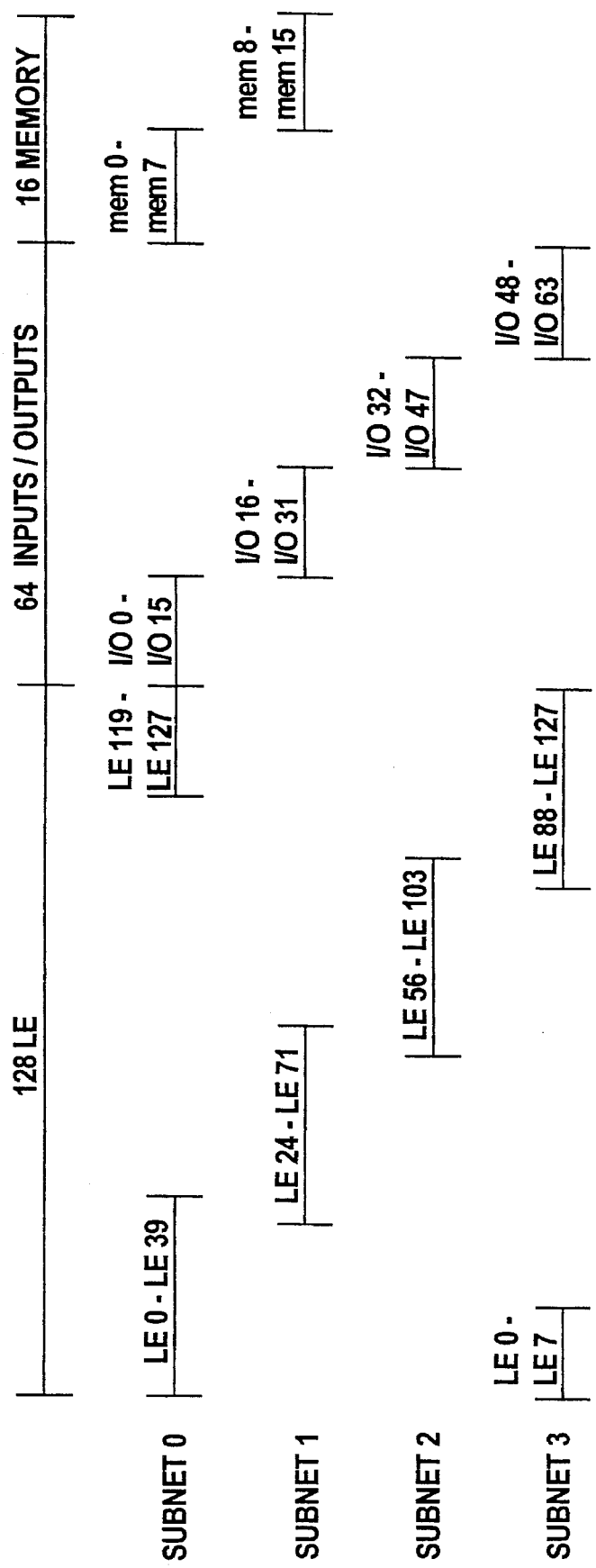
FIG. 4b shows the routing of signals for the inter-LE crossbar network in more detail according to one embodiment of the present invention.

FIG. 4b shows the routing of signals for the subnetworks of FIG. 4a in more detail. Subnetwork0 is used to route the signals of LE0–LE39, LE 119–LE127, I/O0–I/O15, and M0–M7. Subnetwork1 is used to route the signals of LE24–LE71, I/O16–I/O31, and M8–M15. Subnetwork2 is used to route the signals of LE56–LE103, and I/O32–I/O47. Subnetwork3 is used to route the signals of LE0–LE7, LE88–LE127, and I/O48–I/O63. The overlapping coverage of the LEs provides increased flexibility of signal routing for mapping circuit designs.

It is to be appreciated that the routing separation of signals shown in FIG. 4b is only an example and that other separations could be used. For example, the sixteen memory signals could be separated as four signals into each of the four subnetworks. By way of another example, each of the subnetworks could route signals for 40 LEs rather than the 48 shown.

Figure 5:
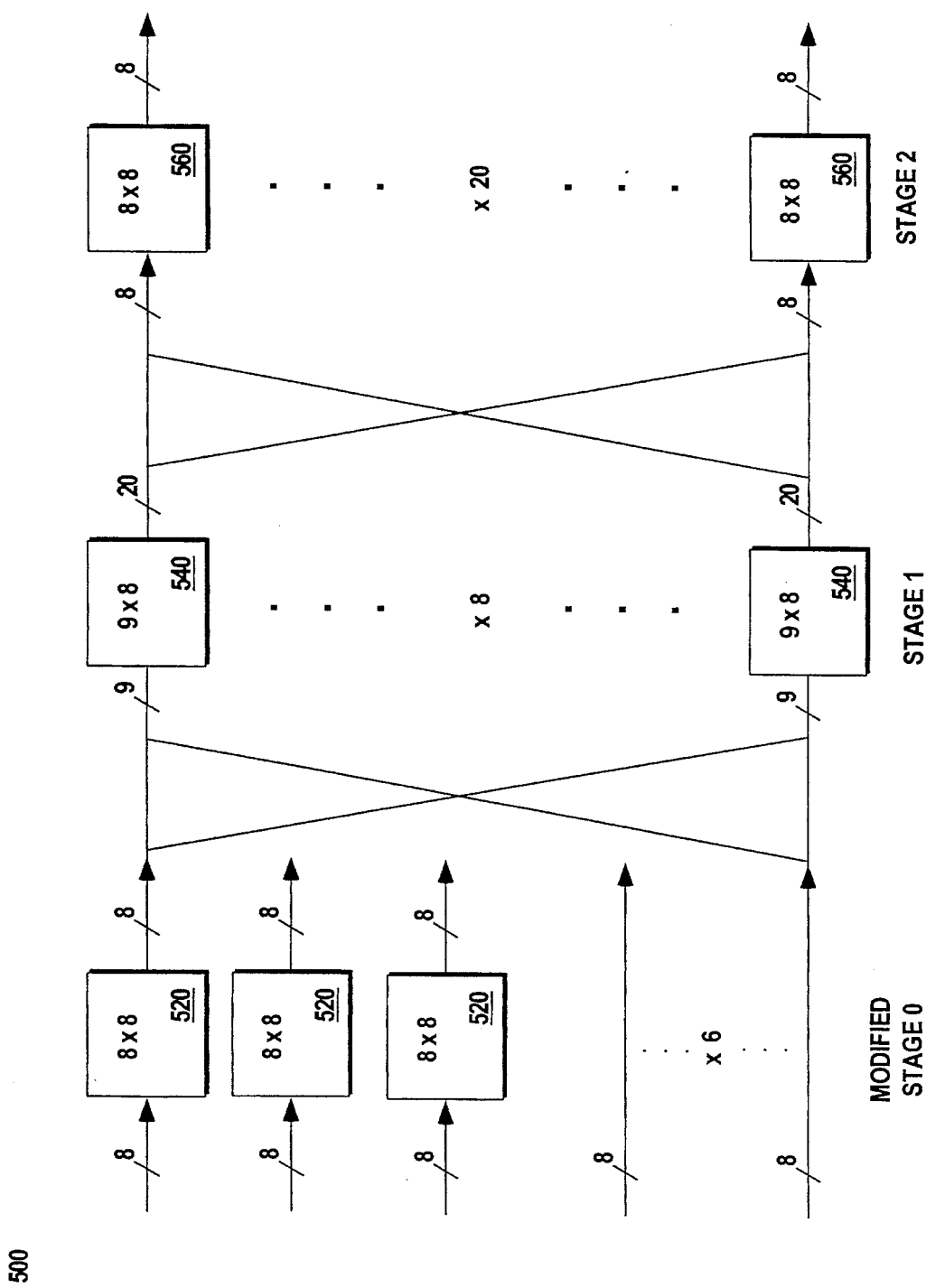
FIG. 5 is a block diagram showing an alternate embodiment of a subnetwork of an inter-LE crossbar network according to one embodiment of the present invention.

FIG. 5 is a block diagram showing an alternate embodiment for each of the first two subnetworks 400 of FIG. 4a. For the embodiment illustrated, six of the nine 8×8 crossbars in stage 0 of subnetwork 400 are eliminated to save space. The remaining three 8×8 crossbars 520 are used for mapping the 16 I/O and 8 memory signals. Every 8 of the 48 LE signals are correspondingly coupled to the 8 crossbars 540 of stage 1, without stage 0 mapping. The "slight" reduction in routing flexibility in turn is compensated by mapping software 22 of host system 12 by swapping the LEs onto which the circuit elements of a circuit design is mapped, if necessary. Such swapping is well within the ability of those skilled in the art, and accordingly will not be further described.

Having now described the FPGAs including the manner in which their LEs are interconnected on-chip and to the FPGA I/O pins, we now proceed to describe how the FPGAs are interconnected together on a logic board and to the logic board's I/O pins.

Figure 6A:
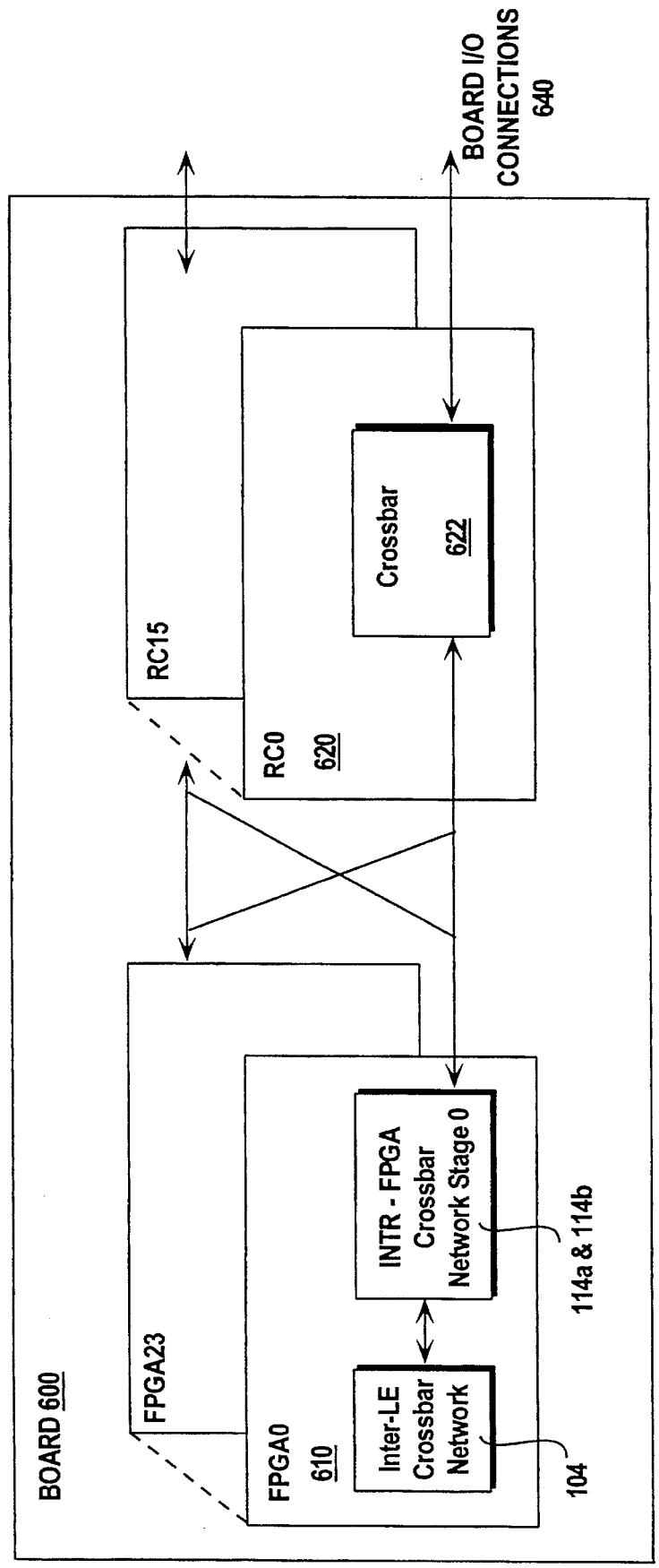
FIG. 6a is a block diagram of a circuit board which can be used in an emulator system according to one embodiment of the present invention

FIG. 6a is a block diagram of a circuit board which can be used in an emulator system according to one embodiment of the present invention. A circuit board 600 is shown comprising multiple FPGAs 610 and routing chips (RCs) 620 coupled to each other in a "butterfly" manner as shown. In one implementation, each of the FPGAs 610 is an FPGA 100 of FIG. 3. Each RC 620 comprises a crossbar 622.

Recall from earlier description, inter-FPGA network stage 0 is distributively implemented on FPGAs 610. Collectively, RCs 620 implement inter-FPGA network stage 1. Together, the two stages interconnect FPGAs 610 on circuit board 600 and to the I/O pins 640 of circuit board 600. (As will be discussed in more detail below, inter-FPGA network stage 1 also "doubles up" as inter-board network stage 0.)

Thus, signals output by any of the FPGA 610 can be routed to any other FPGA 610 on circuit board 600 or routed off-board, either case, through RCs 620. Similarly, input signals to circuit board 600 can be routed to any one of the on-board FPGAs 610 or rerouted off-board.

In the embodiment shown, board 600 includes twenty-four FPGAs 610 and sixteen RCs 620. However, it is to be appreciated that alternate embodiments can include different numbers of FPGAs and RCs.

Figure 6B:
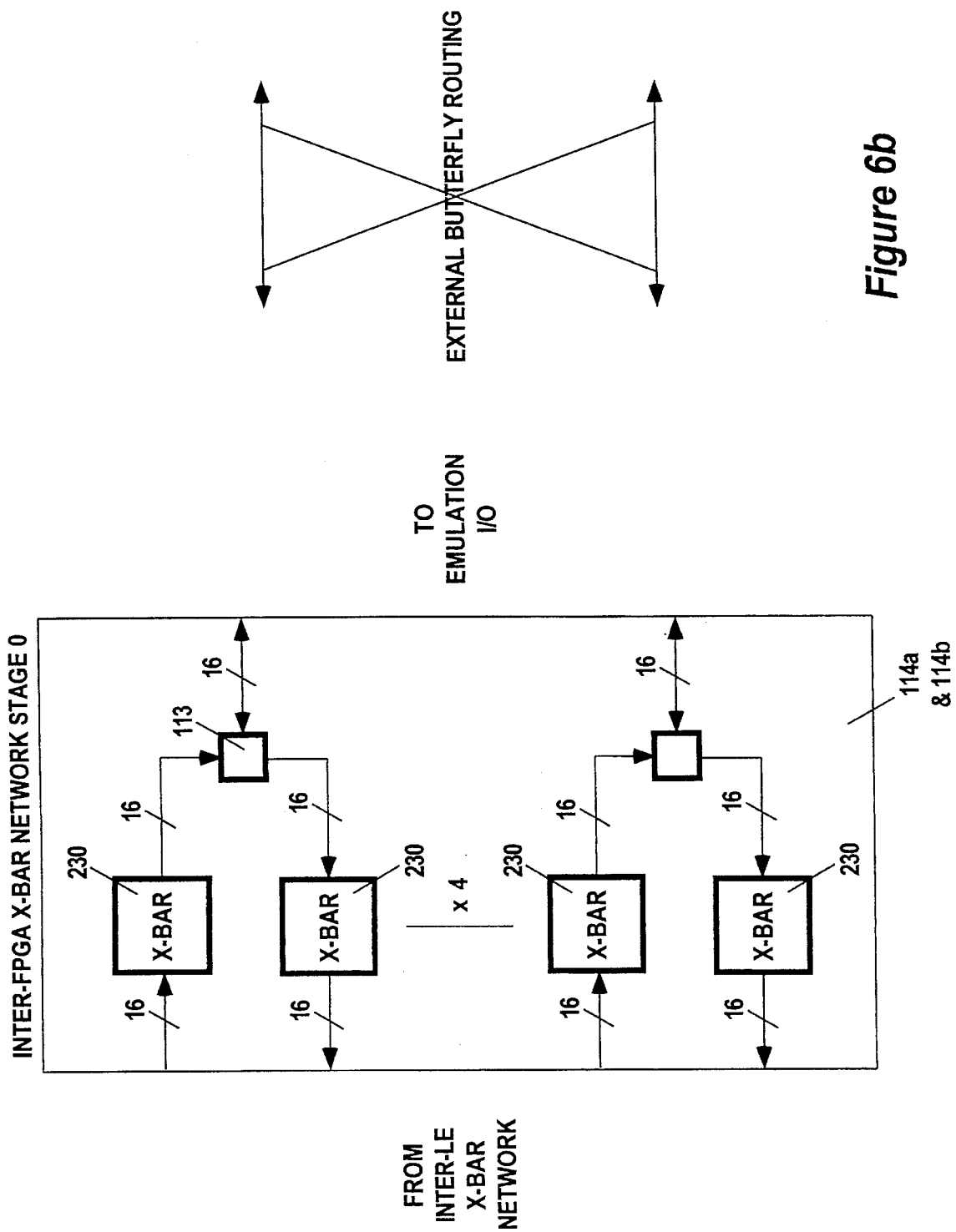
FIG. 6b shows a stage of the inter-FPGA crossbar network in more detail according to one embodiment of the present invention.

FIG. 6b is a block diagram showing one embodiment of a portion of inter-FPGA crossbar network stage 0 114a–114b implemented on a FPGA. As shown, the portion of inter-FPGA crossbar network stage 0 114a/114b comprises multiple pairs of crossbars 230. Crossbars 230 are coupled to the FPGA's I/O pins 113 in a pairwise manner.

For the illustrated embodiment, the portion of inter-FPGA crossbar network stage 0 114a–114b comprises 4 pairs or eight 16×16 crossbars 230, and there are 64 I/O pins 113. Each of the 64 I/O pins 113 is coupled to two of eight crossbars 230, one coupling being for input and the second coupling being for output. Four of the eight crossbars 230 are used for input and the remaining four are used for output, as shown. The crossbars 230 which are used for input from I/O connections 113 comprise the input portion 114a and the crossbars 230 which are used for output to the I/O connections 113 comprise the output portion 114b.

Figure 6C:
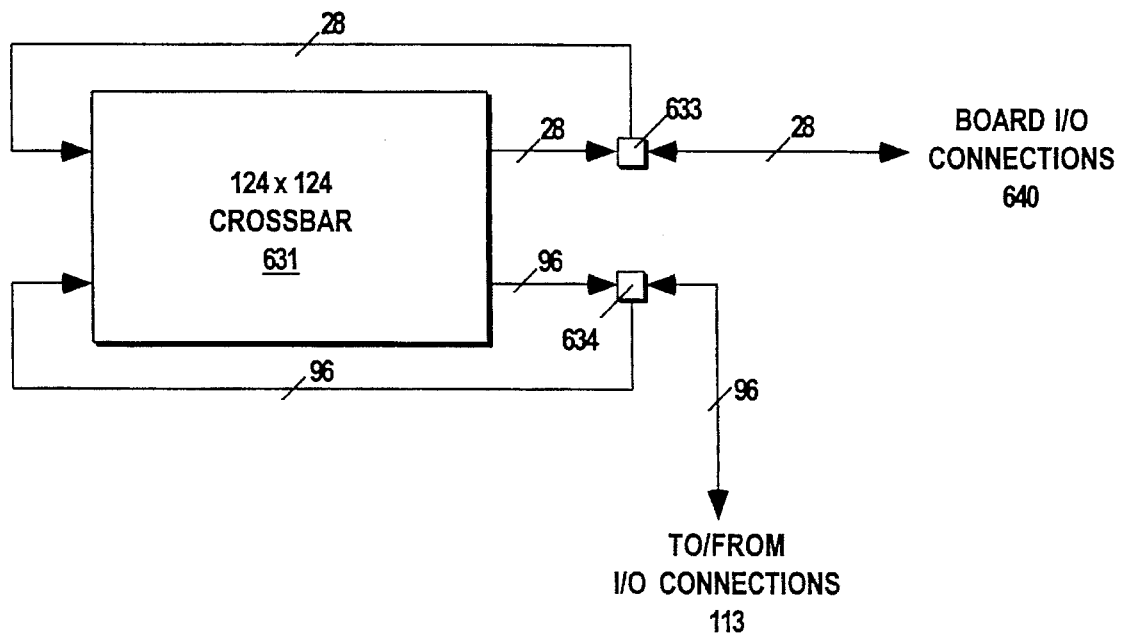
FIG. 6c is a block diagram showing a routing chip in more detail according to one embodiment of the present invention.

FIG. 6c is a block diagram showing one embodiment of an RC 620 suitable for use in circuit board 600 in more detail. For the illustrated embodiment, RC 620 includes a 124×124 crossbar 631 for mapping 124 signals to 124 signals. Of the 124 signals, 96 are used to map signals to and from on-board FPGAs 610, and the remaining 28 are used to map signals in and out of the circuit board 600. In one embodiment, the I/O connections 633 and 634 are physical pins on an RC 620 chip.

The I/O connections 634 are coupled to the I/O pins 113 of the FPGAs 610 of FIG. 6a. The I/O connections 633 are coupled to the I/O connections 640 of circuit board 600 of FIG. 6a. The I/O connections 633 and 634 can be input to or output from crossbar 631. Each of the I/O connections 633 and 634 can be statically configured to be used as an input or an output connection.

Thus, for the illustrated embodiment, circuit board 600 includes 448 (28×16) I/O connections 640.

Figure 7:
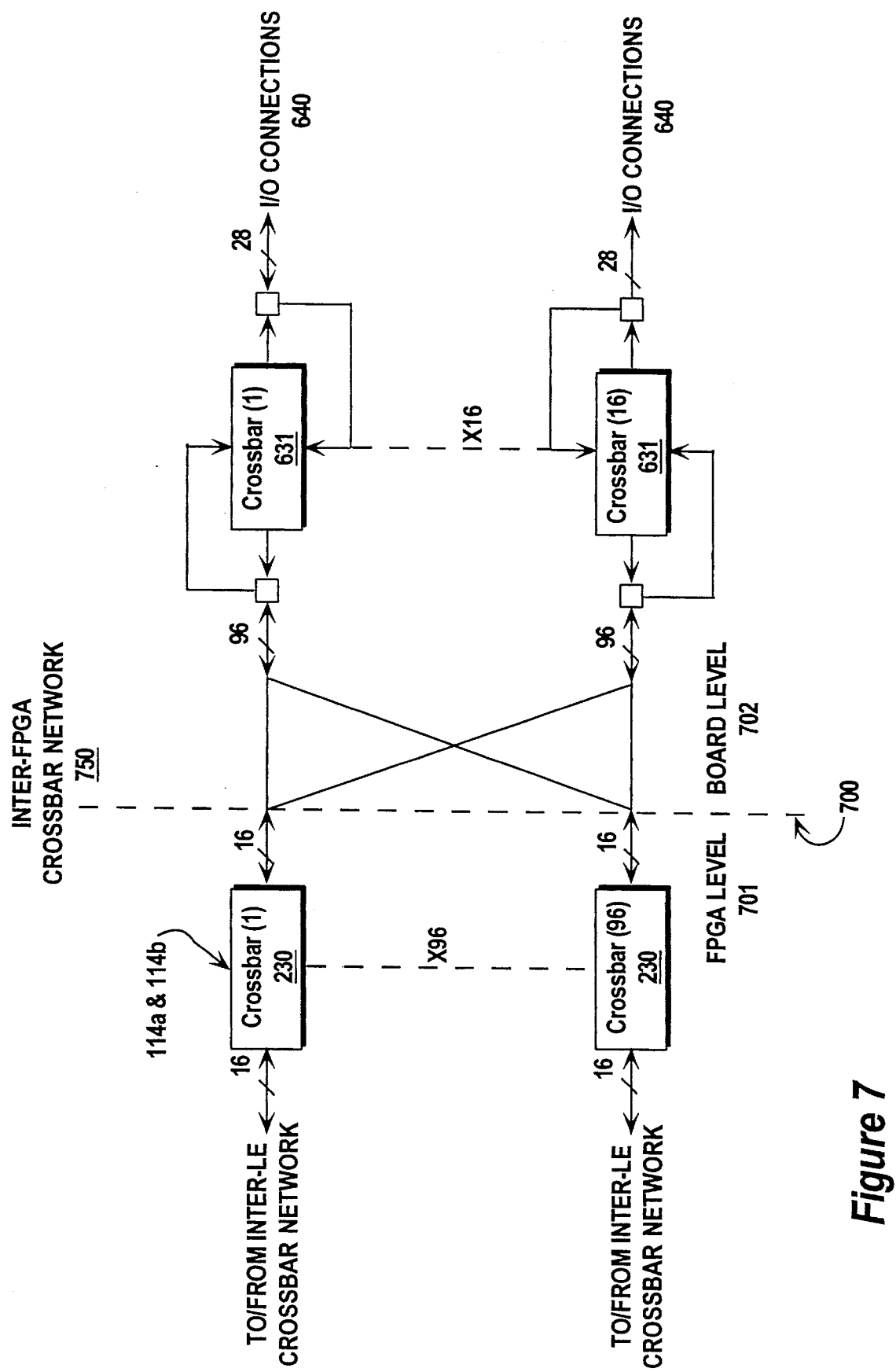
FIG. 7 is a logical view of an inter-FPGA crossbar network according to one embodiment of the present invention.

FIG. 7 is a block diagram showing a logical view of inter-FPGA crossbar network according to one embodiment of the present invention. As described earlier, the inter-FPGA crossbar network 7S0 interconnects the FPGAs on a circuit board such that signals can be routed between any of the FPGAs on the circuit board. In addition, the inter-FPGA crossbar network 750 also interconnects the FPGAs to the circuit board I/O connections so that signals can be routed between the circuit board I/O connections and the FPGAs.

The routing of signals in the inter-FPGA crossbar network 750 spans both the FPGA level and the circuit board level. A division line 700 is shown in FIG. 7 which identifies a separation between FPGA level 701 and board level 702. Crossbars 230 (corresponding to stage 114a/114b) is implemented in FPGA 610 of FIG. 6. The second stage of the inter-FPGA crossbar network, however, is implemented in the board level 702. I/O signals (16) from each of the four crossbars 230 of the 24 FPGAs (4×24=96) are coupled to the "FPGA-side" of the 16 RCs 631. On the "board-side" of 16 RCs 631, 28×16=448 signals are coupled to and from the logic board's I/O connections 640.

For the above described embodiment, wherein there are 24 FPGAs 610, each having 64 I/O connections, disposed on circuit board 600, having 448 I/O connections, a total of {(24×64)+448} or {1536+448} are interconnected together by inter-FPGA crossbar network 750.

Having now described the inter-FPGA crossbar network, we now proceed to described the inter-board crossbar network for interconnecting multiple logic boards together and to external devices.

Figure 8:
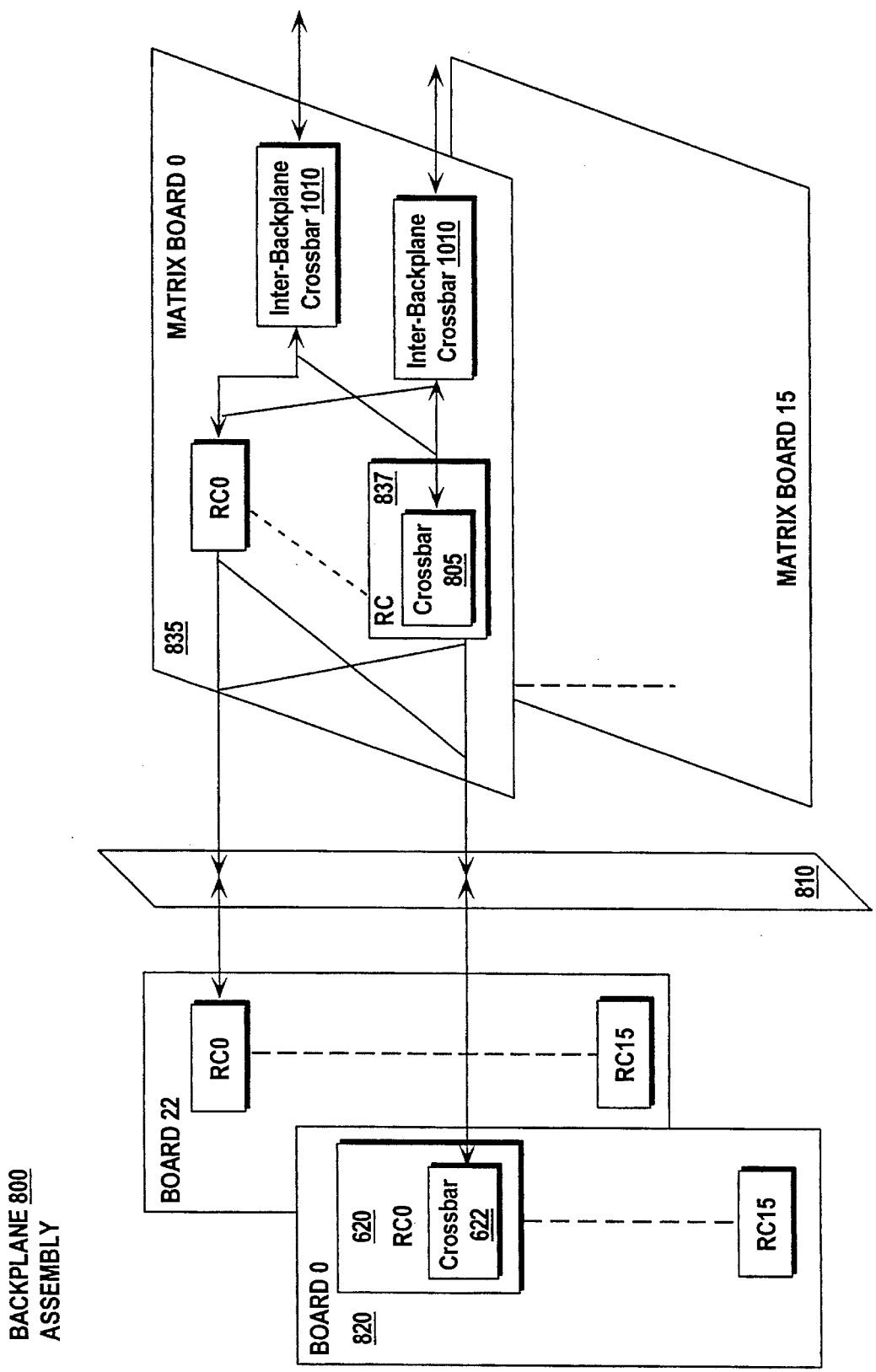
FIG. 8 is a block diagram of a backplane assembly according to one embodiment of the present invention.

FIG. 8 is a block diagram of a backplane assembly according to one embodiment of the present invention. Backplane assembly 800 is used to interconnect circuit boards 820. Circuit boards 820 may be logic boards 600 of FIG. 6a or I/O board for interfacing with external devices. In other words, backplane assembly 800 is used to interconnect FPGAs disposed on logic boards 600 with each other and with external devices.

Figure 12:
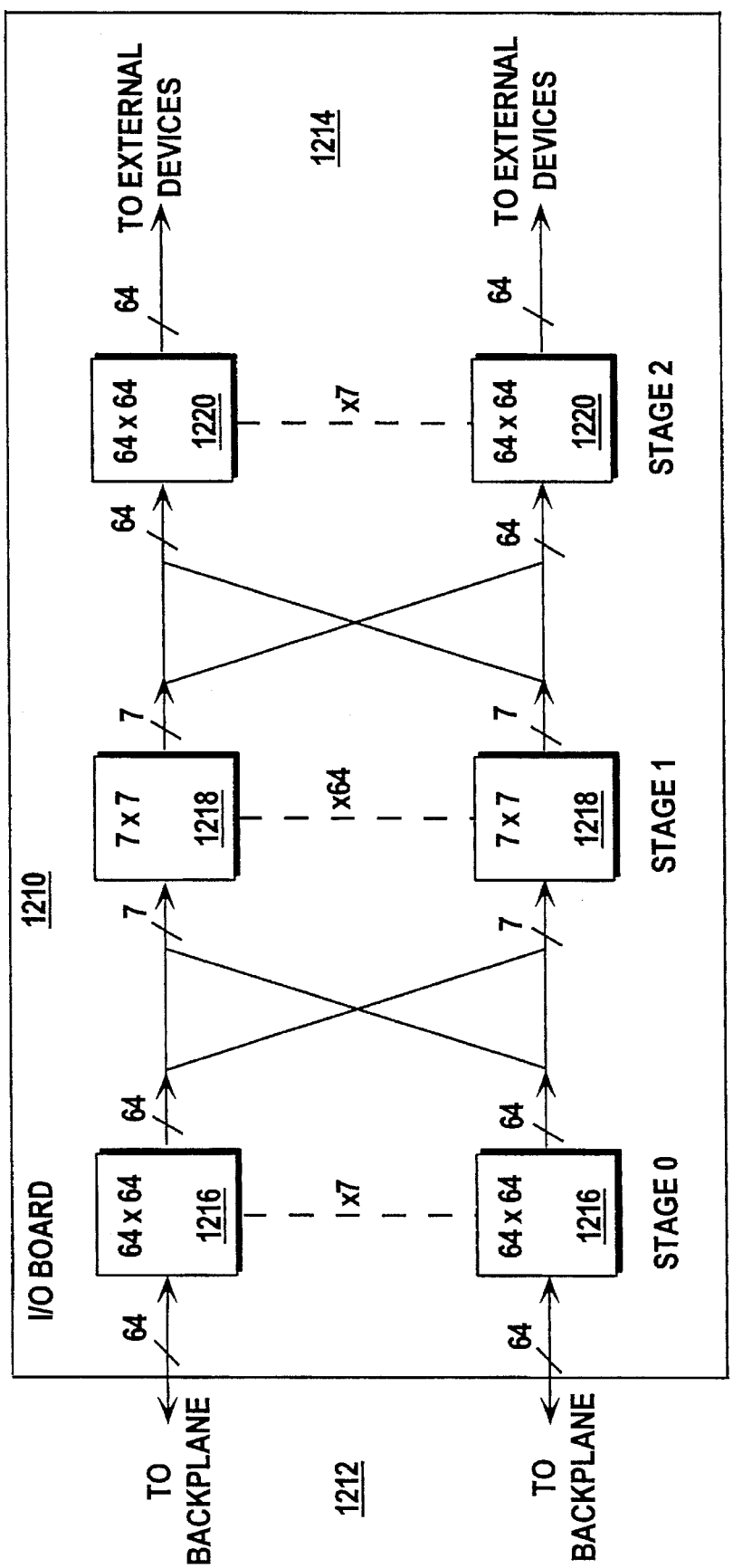
FIG. 12 is a block diagram of an I/O board according to one embodiment of the present invention.

Before describing backplane assembly 800 further, we now skip to FIG. 12, wherein one embodiment of an I/O board is shown. As shown, for the illustrated embodiment, I/O board 1210 comprises two sets of 448 I/O pins 1212 and 1214, and a three stage crossbar network for mapping one set of the 448 signals to the other set of 448 signals, stage 0, stage 1 and stage 2. The first set of 448 signals are used for exchanging signals with backplane assembly 800, whereas the second set of 448 signals are used for exchanging signals with external devices. Thus, I/O board 1210 is completely "interchangeable" with logic board 600 as far as its connection to backplane assembly 800.

As shown, stage 0 comprises seven 64×64 crossbars 1216. Stage 1 in turn comprises sixty-four 7×7 crossbars 1218. Finally, stage 3 also comprises seven 64×64 crossbars 1220.

Returning now to FIG. 8, backplane assembly 800 comprises backplane 810 and a number of matrix boards 835. Backplane 810 is used to accept circuit boards 820, whereas matrix boards 835 are used to interconnect signals to and from the various circuit boards 820.

For the illustrated embodiment, backplane board 810 accepts twenty-three (23) circuit boards 820. Typically, 20 of the 23 circuit boards 820 are logic boards 600 of FIG. 6, whereas the remaining three are I/O boards 1210 of FIG. 12. Sixteen (16) matrix boards 835, each comprising 28 RCs 837, are provided for interconnecting circuit boards 820. (In an alternate embodiment, for ease of manufacturing, multiple RCs 837 are actually combined and implemented using larger "standard" RCs, even if their total pin requirements do not add up to the capacity of the larger "standard" RCs, leaving some of the pins unused.). Additionally, each matrix board 835 is further provided with two RCs 1010 for interconnecting backplane assembly 800 with other backplane assemblies 800, to be described in more detail below.

Recall from earlier description that inter-FPGA crossbar network stage 1 also "doubles up" as inter-board crossbar network stage 0. Collectively, the 16 sets of 28 RCs 805 implement inter-board crossbar network stage 1. Together, the two stages implement the inter-board crossbar network.

Figure 9:
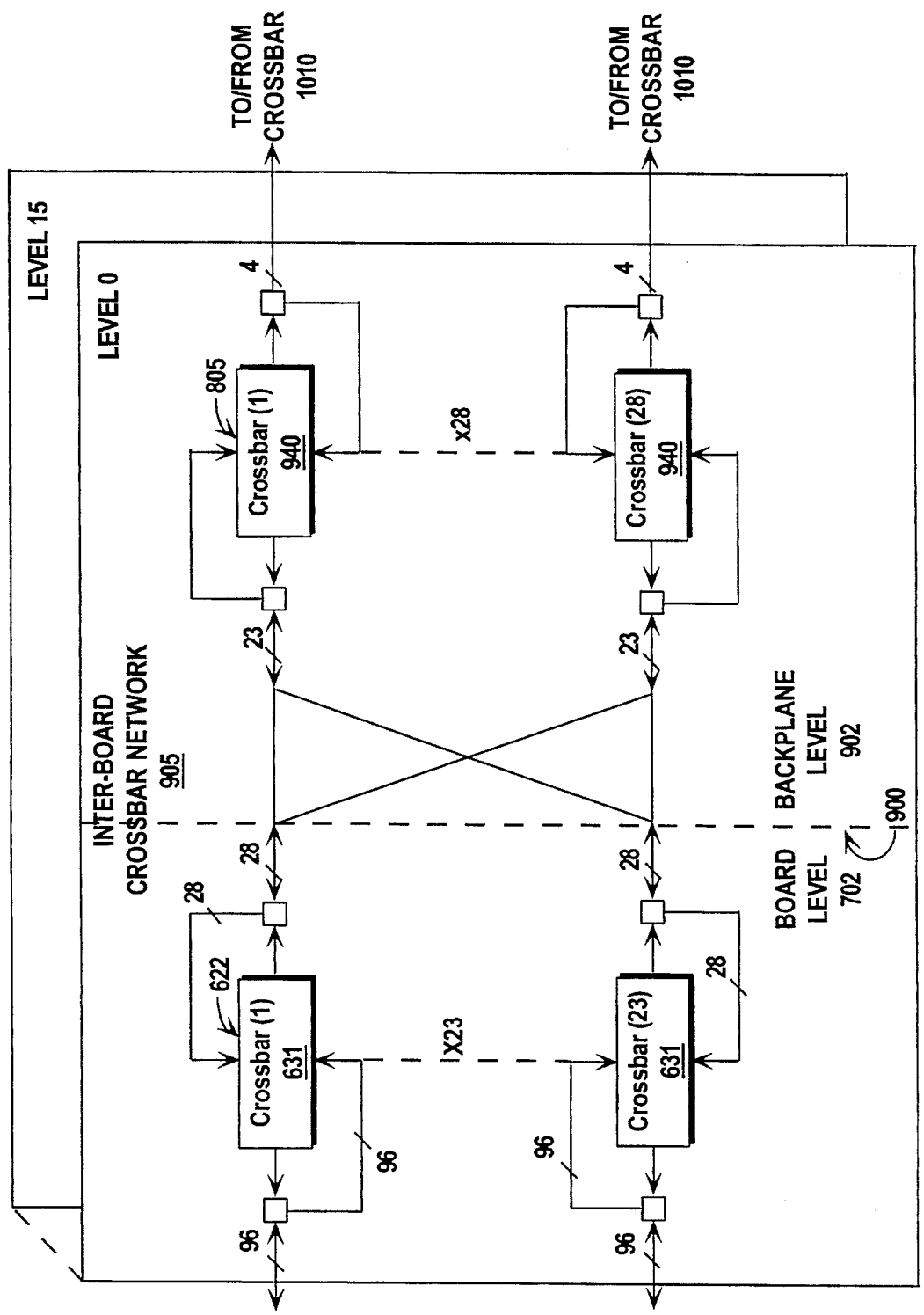
FIG. 9 shows an inter-board crossbar network according to one embodiment of the present invention.

FIG. 9 is a block diagram illustrating a logical view of inter-board crossbar network. As described earlier, inter-board crossbar network 905 spans two physical form levels, i.e. board level 702 and backplane level 902 separated by dotted line 900. As shown, for the illustrated embodiment, stage 0 comprises 23 124×124 crossbars 631, each having 28 board I/O connections, whereas stage 1 comprises 28 27×27 crossbars 940, each having 23 "board-side" I/O connections. The 28 board I/O connections of the 23 crossbars 631 and the 23 "board-side" I/O connections of the 28 crossbars 940 are connected to each other in a "butterfly" manner. Additionally, each crossbar 940 also has 4 "crateside" I/O connections, to be described more fully below.

Having now described the inter-board crossbar network, we now proceed to describe how backplane assemblies of various crates are interconnected connected together to form a multi-crate system.

Figure 10:
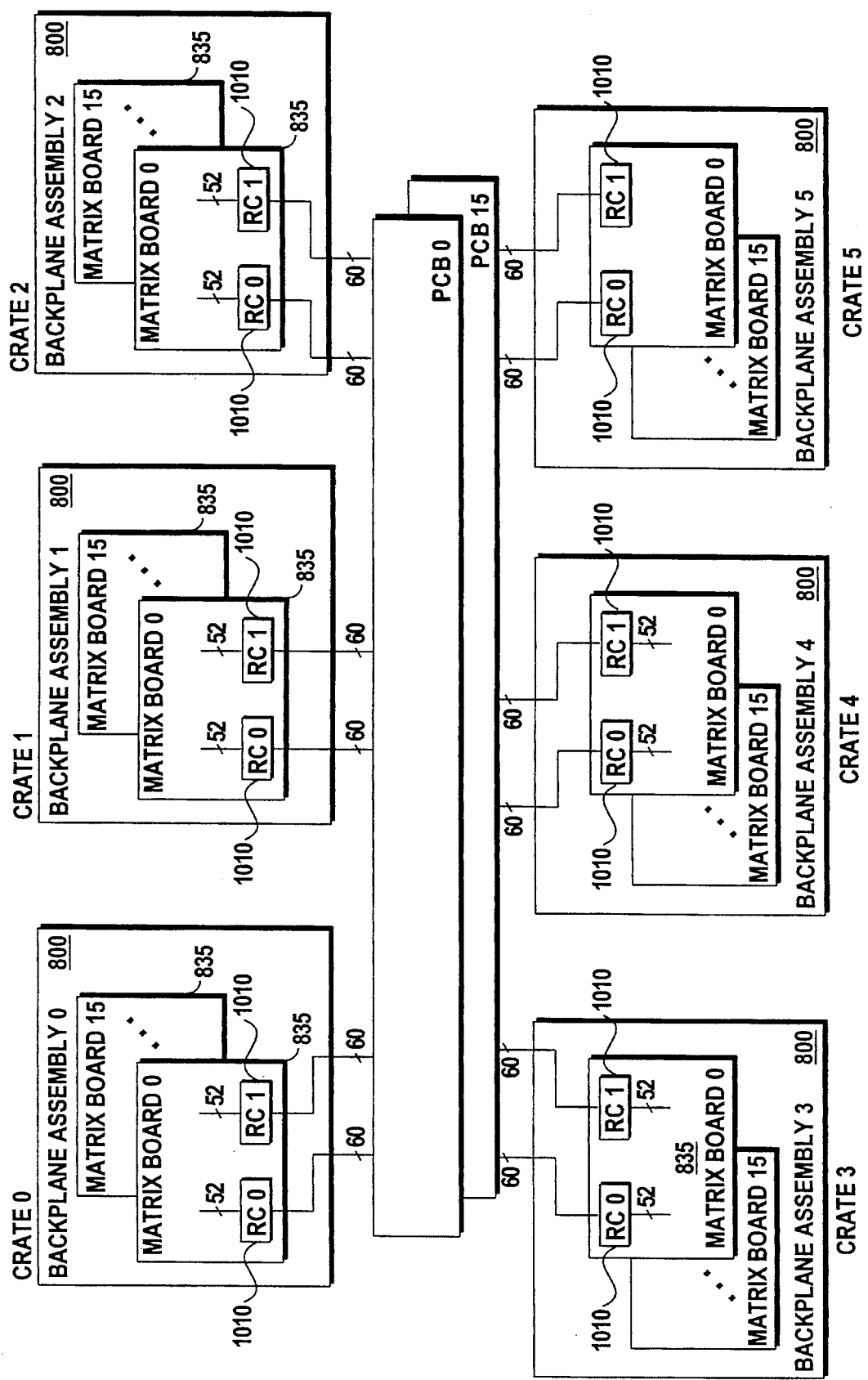
FIG. 10 is a block diagram showing a multi-crate system according to one embodiment of the present invention.
Figure 11:
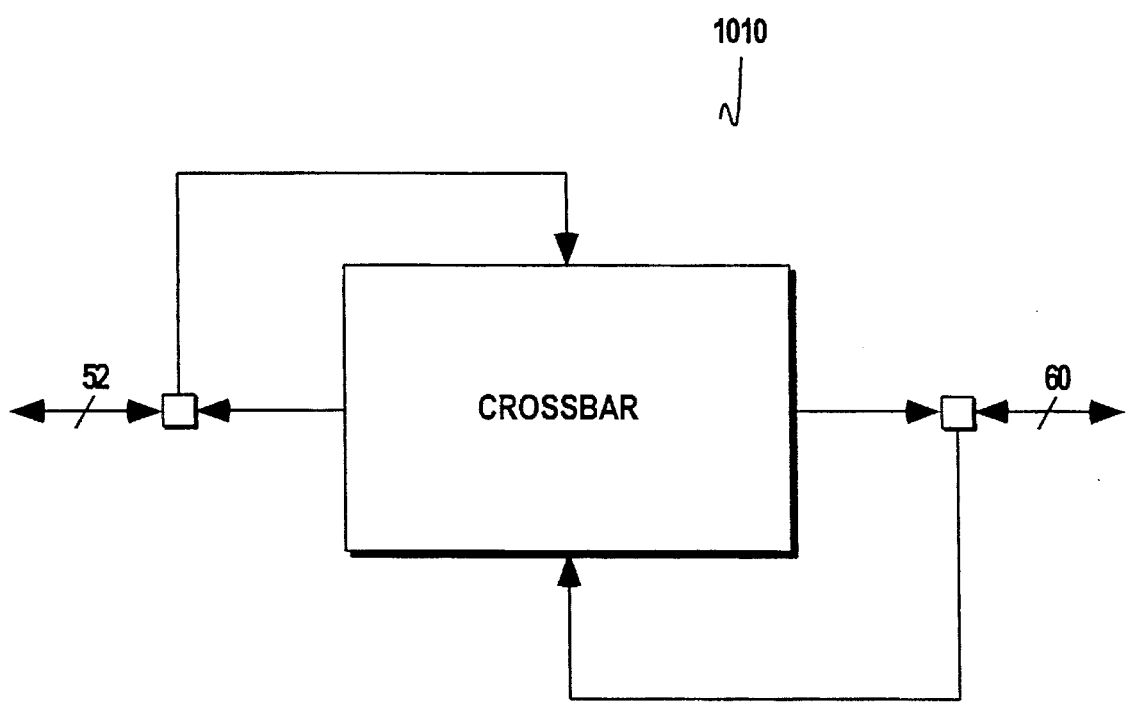
FIG. 11 is a block diagram showing how the backplane assemblies of the various crates are interconnected together according to one embodiment of the present invention.

FIG. 10 is a block diagram showing a multi-crate emulation system according to one embodiment of the present invention. As shown, for the illustrated embodiment, multi-crate emulation system 1000 includes six crates of backplane assemblies 800. As described earlier, each backplane assembly 800 comprises 16 matrix boards 835, with each matrix board having 2 RCs 1010, a first and a second. As described earlier, each RC 1010 has 52 "backplane-side" interconnections coupled to the 4 connections of the 28 RCs 805 on the same matrix board 835. Additionally, each RC 1010 also has 60 "crate-side" interconnections divided into 5 groups of 12 interconnections. FIG. 11 illustrates one embodiment of RC 1010.

Each matrix board 835 is correspondingly coupled to each other through a printed circuit board (PCB) 1025. Each PCB 1025 facilitates a "full crossbar like" interconnection between the first RCs 1010 and between the second RCs 1010 of the backplane assemblies 800. In other words, the five groups of 12 interconnections of the first RC 1010 of the first backplane assembly 800 is coupled to the first group of 12 interconnections of the first RC 1010 of the second, third, fourth, fifth and sixth backplane assembly 800. The remaining four groups of 12 interconnections of the first RC 1010 of the second backplane assembly 800 are coupled to the second group of 12 interconnections of the first RC 1010 of the third, fourth, fifth and sixth backplane assembly 800. The remaining three groups of 12 interconnections of the first RC 1010 of the third backplane assembly 800 are coupled to the third group of 12 interconnections of the first RC 1010 of the fourth, fifth and sixth backplane assembly 800, and so forth.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, an emulation system employing a scalable multi-level multi-stage network topology has been described.

What is claimed is:

1. A field programmable gate array (FPGA) comprising a plurality of reconfigurable logic elements (LEs) for emulating circuit elements of a circuit design;

a plurality of input/output (I/O) pins;

an on-chip multi-stage inter-LE network of programmable interconnect devices coupled to the I/O pins and the reconfigurable LEs for selectively interconnecting the reconfigurable LEs to each other and to the I/O pins, and an on-chip subset of a first stage of an inter-FPGA network of programmable interconnect devices disposed in between the I/O pins and the inter-LE network of programmable interconnect devices for interconnecting the FPGA to other FPGAs and to I/O pins of a logic board wherein the FPGAs are disposed.

2. The FPGA as set forth in claim 1, wherein the on-chip multi-stage network of programmable interconnect devices comprises a plurality of multi-stage subnetworks of programmable interconnect devices interconnecting overlapping subsets of the reconfigurable LEs to each other and to subsets of the I/O pins.

3. The FPGA as set forth in claim 2, wherein one of the multi-stage subnetworks of programmable interconnect devices comprises a first stage having a first plurality of programmable interconnect devices for mapping a first subset of the I/O pins to a first plurality of intermediate signal lines and a second plurality of programmable interconnect devices for mapping a first subset of the reconfigurable LEs to a second plurality of intermediate signal lines.

4. The FPGA as set forth in claim 2, wherein one of the multi-stage subnetworks of programmable interconnect devices comprises a first stage having a plurality of programmable interconnect devices for mapping a first subset of the I/O pins to a first plurality of intermediate signal lines, and a plurality of fixed interconnect signal lines for deterministically coupling a first subset of the reconfigurable LEs to a second plurality of intermediate signal lines.

5. The FPGA as set forth in claim 1, wherein the FPGA further comprises a memory unit; and the on-chip multi-stage network of programmable interconnect devices is further coupled to the memory unit for interconnecting the reconfigurable LEs to the memory unit.

6. A logic board comprising:

a plurality of board input/output (I/O) pins;

a plurality of field programmable gate arrays (FPGAs), each having a plurality of reconfigurable logic elements (LEs) for emulating circuit elements of a circuit design, a plurality of FPGA I/O pins, an on-chip multi-stage inter-LE network of programmable interconnect devices (PIDs) coupled to the FPGA I/O pins and the reconfigurable LEs for selectively interconnecting the reconfigurable LEs to each other and to the FPGA I/O pins, and an on-chip subset of a first stage of an inter-FPGA network of PIDs disposed in between the FPGA I/O pins and the inter-LE network of PIDs for interconnecting the FPGA to other FPGAs and to board I/O pins; and a second stage of the inter-FPGA network of PIDs coupled to the FPGAs and the board I/O pins for cooperating with the distributively implemented on-chip first stage of the inter-FPGA network of PIDs for interconnecting the FPGAs to each other and to the board I/O pins.

7. The logic board as set forth in claim 6, wherein each on-chip multi-stage inter-LE network of PIDs comprises a plurality of multi-stage subnetworks of PIDs interconnecting overlapping subsets of the reconfigurable LEs of the FPGA to each other and to subsets of the FPGA I/O pins.

8. The logic board as set forth in claim 7, wherein each multi-stage subnetwork of PIDs comprises a first stage having a first plurality of PIDs for mapping a first subset of the I/O pins of the FPGA to a first plurality of intermediate signal lines on the FPGA and a second plurality of PIDs for mapping a first subset of the reconfigurable LEs of the FPGA to a second plurality of intermediate signal lines on the FPGA.

9. The logic board as set forth in claim 7, wherein each multi-stage subnetwork of PIDs comprises a first stage having a plurality of PIDs for mapping a first subset of the I/O pins of the FPGA to a first plurality of intermediate signal lines on the FPGA, and a plurality of fixed interconnect signal lines for deterministically coupling a first subset of the reconfigurable LEs of the FPGA to a second plurality of intermediate signal lines on the FPGA.

10. The logic board as set forth in claim 6, wherein each FPGA further comprises a memory unit; and each on-chip multi-stage inter-LE network of PIDs is further coupled to the memory unit of the FPGA for interconnecting the reconfigurable LEs of the FPGA to the memory unit of the FPGA.

11. The logic board as set forth in claim 6, wherein the second stage of the inter-FPGA network of PIDs comprises a plurality of PIDs coupled to the PIDs at the first stage of the inter-FPGA network for interconnecting the FPGA I/O pins to each other and to the logic board I/O pins.

12. The logic board as set forth in claim 6, wherein the second stage of the inter-FPGA network of PIDs also serves as a first stage of an inter-logic board network of PIDs for interconnecting the logic board to other logic boards and one or more I/O boards.

13. An emulation system comprising:

a plurality of reconfigurable logic elements (LEs) for emulating circuit elements of a circuit design, distributively packaged in a plurality of FPGAs;

a scalable multi-level multi-stage network of programmable interconnect devices (PIDs) coupled to the reconfigurable LEs for interconnecting at least the reconfigurable LEs to each other, the scalable multi-level multi-stage network comprises a plurality of on-chip multi-stage inter-LE networks of PIDs correspondingly disposed on the FPGAs and coupled to the reconfigurable LEs of the corresponding FPGAs and interconnecting the corresponding reconfigurable LEs to each other and to I/O pins of the corresponding FPGAs.

14. The emulation system as set forth in claim 13, wherein each on-chip multi-stage inter-LE network of PIDs comprises a plurality of multi-stage subnetworks of PIDs interconnecting overlapping subsets of the reconfigurable LEs of the FPGA to each other and to subsets of the I/O pins of the FPGA.

15. The emulation system as set forth in claim 14, wherein each multi-stage subnetwork of PIDs comprise a first stage having a first plurality of PIDs for mapping a first subset of the I/O pins of the FPGA to a first plurality of intermediate signal lines on the FPGA and a second plurality of PIDs for mapping a first subset of the reconfigurable LEs of the FPGA to a second plurality of intermediate signal lines on the FPGA.

16. The emulation system as set forth in claim 14, wherein each multi-stage subnetwork of PIDs comprises a first stage having a plurality of PIDs for mapping a first subset of the I/O pins of the FPGA to a first plurality of intermediate signal lines on the FPGA, and a plurality of fixed interconnect signal lines for deterministically coupling a first subset of the reconfigurable LEs of the FPGA to a second plurality of intermediate signal lines on the FPGA.

17. The emulation system as set forth in claim 13, wherein
   each FPGA further comprises a memory unit; and
   each on-chip multi-stage network of PIDs is further coupled to the memory unit of the FPGA for interconnecting the reconfigurable LEs of the FPGA to the memory unit of the FPGA.

18. The emulation system as set forth in claim 13, wherein
   the FPGAs are distributively packaged on a plurality of logic boards; and
   the scalable multi-level multi-stage network of PIDs further comprises a plurality of multi-stage inter-FPGA networks of PIDs correspondingly disposed on the logic boards for interconnecting the FPGAs within the logic boards and to the corresponding I/O pins of the logic boards.

19. The emulation system as set forth in claim 18, wherein each multi-stage inter-FPGA network of PIDs comprises a first and a second inter-FPGA stage, the first inter-FPGA stage being distributively implemented on the FPGAs in between the corresponding on-chip multi-stage inter-LE networks of PIDs and the FPGA I/O pins correspondingly interconnecting the on-chip multi-stage inter-LE networks to the FPGA I/O pins, and the second inter-FPGA stage being implemented on the logic board correspondingly interconnecting the FPGAs of the logic board to I/O pins of the logic board.

20. The emulation system as set forth in claim 19, wherein the second inter-FPGA stage of each multi-stage inter-FPGA network of PIDs comprises a plurality of PIDs coupled to the PIDs at the corresponding portions of the first inter-FPGA stage of the multi-stage inter-FPGA network for correspondingly interconnecting the FPGA I/O pins of the FPGAs of the logic board to each other and to the logic board I/O pins of the logic board.

21. The emulation system as set forth in claim 20, wherein
   the logic boards are distributively packaged into one or more crates; and
   the scalable multi-level multi-stage network of PIDs further comprises at least one multi-stage inter-board network of PIDs coupled to the multi-stage inter-FPGA networks of the logic boards of a crate for interconnecting the logic boards of the crate.

22. The emulation system as set forth in claim 21, wherein each of the at least one multi-stage inter-board network of PIDs comprises a first and a second inter-board stage, the first inter-board stage being distributively implemented on the logic boards using the second inter-FPGA stages, and the second inter-board stage being implemented on a backplane assembly of the crate.

23. The emulation system as set forth in claim 22, wherein,
   the backplane assembly of each crate comprises a plurality of matrix boards; and
   the second inter-board stage of each multi-stage inter-board network of PIDs comprises a plurality of PIDs coupled to corresponding portions of the distributively implemented first inter-board stage for correspondingly interconnecting the corresponding portions.

24. The emulation system as set forth in claim 23, wherein
   the emulation system comprises at least two crates; and
   the scalable multi-level multi-stage network of PIDs further comprises a multi-stage inter-crate network of PIDs for interconnecting the at least two backplane assemblies of the at least two crates.

25. The emulation system as set forth in claim 24, wherein the multi-stage inter-crate network of PIDs comprises a first and a second inter-crate stage, the first inter-crate stage being distributively implemented on the matrix boards correspondingly coupled to the second inter-board stages, and the second inter-crate stage being implemented with a plurality of printed circuit boards (PCBs) coupled to corresponding portions of the first inter-crate stage.

26. The emulation system as set forth in claim 21, wherein
   a first crate includes at least one I/O board for interconnecting the emulation system to one or more external devices; and
   the multi-stage inter-board network of PIDs of the first crate is further coupled to the at least one I/O board for interconnecting the at least one I/O board and the logic boards of the first crate to each other.

* * * * *